United States Patent
Lauritsen et al.

(10) Patent No.: US 9,567,869 B2
(45) Date of Patent: Feb. 14, 2017

(54) WIND TURBINE SYSTEM FOR DETECTION OF BLADE ICING

(75) Inventors: Steen M. Lauritsen, Egå (DK); Erik Carl Lehnskov Miranda, Randers SV (DK)

(73) Assignee: VESTAS WIND SYSTEMS A/S, Aarhus N (DK)

(*) Notice: Subject to any disclaimer, the term of this patent is extended or adjusted under 35 U.S.C. 154(b) by 854 days.

(21) Appl. No.: 13/807,465

(22) PCT Filed: Jun. 29, 2011

(86) PCT No.: PCT/DK2011/050244
§ 371 (c)(1),
(2), (4) Date: Apr. 11, 2013

(87) PCT Pub. No.: WO2012/000509
PCT Pub. Date: Jan. 5, 2012

(65) Prior Publication Data
US 2013/0195657 A1  Aug. 1, 2013

Related U.S. Application Data

(60) Provisional application No. 61/360,112, filed on Jun. 30, 2010.

(30) Foreign Application Priority Data

Jun. 30, 2010  (DK) .................. 2010 70306

(51) Int. Cl.
*F01D 25/00*   (2006.01)
*F03D 80/40*   (2016.01)
*F03D 7/04*    (2006.01)

(52) U.S. Cl.
CPC .............. *F01D 25/00* (2013.01); *F03D 7/042* (2013.01); *F03D 80/40* (2016.05); *F05B 2260/80* (2013.01);
(Continued)

(58) Field of Classification Search
CPC .. F03D 11/0025; F03D 11/0091; F03D 7/042; F01D 25/00; F05B 2270/807; F05B 2270/808; F05B 2270/81; F05B 2260/80; F05B 2260/96; F05B 2270/334; Y02E 10/722; Y02E 10/723
(Continued)

(56) References Cited

U.S. PATENT DOCUMENTS 6,890,152 B1 *  5/2005  Thisted .............................. 416/1
7,086,834 B2 *  8/2006  LeMieux .......................... 416/1
(Continued)

FOREIGN PATENT DOCUMENTS

DE   10065314 A1 *  7/2002  ............. G01H 1/006
EP   2075462 A2       7/2009
(Continued)

OTHER PUBLICATIONS

Closed Loop Control Wind Tunnel Tests on an Adapative Wind Turbine Blade for Load Reduction—Barlas et al (Jan. 2008).*
(Continued)

*Primary Examiner* — Thomas Denion
*Assistant Examiner* — Jessica Kebea
(74) *Attorney, Agent, or Firm* — Patterson + Sheridan, LLP (57) ABSTRACT

The invention relates to a method for detecting icing and other loadings on blades of wind turbines. Advantageously, the method utilizes existing wind turbine actuators, for example pitch actuators, far excitation of blade vibrations. Vibration sensors on the blade such as strain sensors or accelerometers measure the blade vibrations excited in response to the actively excised vibrations. By comparing the measured response with previously obtained reference responses, it is possible to determine if blade icing is present.

18 Claims, 6 Drawing Sheets

(52) U.S. Cl.
CPC ...... *F05B 2260/96* (2013.01); *F05B 2270/334* (2013.01); *F05B 2270/807* (2013.01); *F05B 2270/808* (2013.01); *Y02E 10/722* (2013.01); *Y02E 10/723* (2013.01)

(58) Field of Classification Search
USPC ....... 416/1, 31, 36, 37, 39, 41, 44, 47, 48, 6
See application file for complete search history.

(56) References Cited

U.S. PATENT DOCUMENTS

| | | | |
|---|---|---|---|
| 7,854,589 B2* | 12/2010 | Nielsen et al. | 416/1 |
| 7,883,319 B2* | 2/2011 | Volkmer | 416/61 |
| 8,123,478 B2* | 2/2012 | Ahmann | 416/1 |
| 8,170,810 B2* | 5/2012 | Volkmer | 702/41 |
| 8,393,216 B2* | 3/2013 | Guy | 73/577 |
| 2009/0185901 A1* | 7/2009 | Nielsen | F03D 7/0224 416/1 |
| 2010/0158688 A1 | 6/2010 | Benito et al. | |
| 2010/0175480 A1* | 7/2010 | Guy | G01M 5/0016 73/660 |
| 2010/0189560 A1* | 7/2010 | Haraguchi | 416/1 |
| 2010/0215493 A1* | 8/2010 | Abdallah et al. | 416/23 |
| 2012/0253697 A1* | 10/2012 | Frankenstein et al. | 702/39 |
| 2012/0257967 A1* | 10/2012 | Egedal et al. | 416/1 |
| 2013/0272874 A1* | 10/2013 | Hess | F03D 7/0224 416/1 |

FOREIGN PATENT DOCUMENTS

| | | | |
|---|---|---|---|
| EP | 2112375 A2 | | 10/2009 |
| EP | 2565447 A1 | * | 3/2013 |
| WO | 2006/012827 A1 | | 2/2006 |

OTHER PUBLICATIONS

Structural Health Monitoring Techniques for Wind Turbine Blades—Ghoshal et al (2000).*
DE 10065314 A1 Englsih Translation.*
International Search Report, PCT/DK2011/050244, Mar. 7, 2012.

* cited by examiner

WIND TURBINE SYSTEM FOR DETECTION OF BLADE ICING

FIELD OF THE INVENTION

The invention relates to wind turbine systems and in particular to systems for detection of blade icing.

BACKGROUND OF THE INVENTION

Downtime and failures of wind turbines due to undesired loading of wind turbine blades, primarily due to icing is unacceptable in modern wind turbines. Similarly, even small ice accretion impacts the power curve of a wind turbine and, therefore, implies lost production. Furthermore, ice may shed from a blade and cause personal injuries or damages to technical installations.

Accordingly, methods for detection of icing and other undesired blade loading are desired to avoid such problems.

US2005276696 discloses a method for detecting ice on a wind turbine having a rotor and one or more rotor blades each having blade roots, including monitoring meteorological conditions relating to long conditions and monitoring one or more physical characteristics of the wind turbine in operation that vary in accordance with at least one of the mass of the one or more rotor blades or a mass imbalance between the rotor blades. The method also includes using the one or more monitored physical characteristics to determine whether a blade mass anomaly exists, determining whether the monitored meteorological conditions are consistent with blade icing; and signaling an icing-related blade mass anomaly when a blade mass anomaly is determined to exist and the monitored meteorological conditions are determined to be consistent with icing.

Whereas US2005276696 discloses a method for detecting blade icing, the inventors of the present invention have appreciated that an improvement of blade icing detection is of benefit, and have in consequence devised the present invention.

SUMMARY OF THE INVENTION

It would be advantageous to achieve improved methods and systems for detection of undesired loading of blades on wind turbines, e.g. due to icing. Generally it would be desirable to improve blade load detection for achieving faster detection, more reliable detection, cheaper detection systems or more flexible detection systems which may enable load detection of blades both when the wind turbine is in operating and non-operating states. In general, the invention preferably seeks to meet any of the above mentioned objectives singly or in any combination or to provide a method that solves such other problems of the prior art.

To better address one or more of these concerns, in a first aspect of the invention a wind turbine system for detecting a change in the structural, dynamic or aerodynamic behavior of a wind turbine blade is presented, where the system comprises one or more sensors capable of detecting vibrations of the wind turbine blade,
 an exciter capable of exciting a vibration of the blades, where the exciter has primary and secondary functions, the primary function is for operation of the wind turbine and the secondary function is for vibration excitation,
 a signal generator for generating an excitation signal to the exciter for exciting a vibration of the blade,
 a data acquisition unit for receiving a data signal from the one or more sensors,
 a processing unit for determining changes in the structural behavior of the blade on basis of the sensor signal.

Since the detection of undesired loading is obtained from active vibration excitation, the system may advantageously enable detection of undesired loadings both when the rotor is at standstill, when the rotor is freely rotating and when in rotor is in operation. Furthermore, due to the use of active vibration excitation, the vibration response can be obtained simultaneously or almost simultaneously with the excitation so that the detection of possible icing can be determined very rapidly.

The processing of the sensor signal may comprise comparing the sensor signal with a reference or using the sensor data as input to a mathematical model for determining behavioral changes of the blade.

The excitation signal may be superposed to the operating signal used for the exciter's primary function in operation of the wind turbine, or the excitation signal may be used for excitation of the exciter when the exciter is not operated according to its primary function.

Generally the Invention may improve the precision of the ice detection which may enable automatic restart of the wind turbine generator. Increased precision on ice detection may also improve the operation and power production of wind turbines equipped with active de-icing functionality. In this case it will be possible to activate e.g. a heating system at a lower level of ice accretion on the blades and thereby optimize the production by reducing the aerodynamic impact of ice on blades.

An embodiment of the system further comprises a spectrum analyzer for determining the frequency spectrum of the acquired sensor signal. The frequency spectrum may be used as input to a mathematical model or for comparing with a reference spectrum. Since the spectrum may be affected by the state of the blade, i.e. affected by loadings or other structural, dynamic or aerodynamic changes of the blade, the spectrum may advantageously be used for assessing the actual behavior or state of the blade.

In an embodiment a continuous part of the excitation signal may comprise at least one increasing part and at least one decreasing part. In other words, the excitation signal may be a signal which both increases and decreases as a function of time for generating a reciprocal motion or action of the exciter, e.g. a pitch actuator. Alternatively, the excitation signal may comprise only an increasing or decreasing part, such as a step signal or ramp signal, for exciting a kind of a step response.

In an embodiment the excitation signal may comprise a plurality of frequency components. That is, the excitation signal may be in the form of sweep, i.e. a signal having a frequency which varies as a function of time, or the excitation signal may comprise a plurality of frequency components which are superposed.

Thus, in an embodiment the excitation signal may vary in frequency as a function of time.

In an embodiment the processing unit may be capable of determining a new excitation signal for the signal generator, where the frequency content of the excitation signal is changed in dependence of the previously acquired data signal. In this way the excitation signal may be fine tuned adaptively, e.g. for improving the accuracy of detection of changes in a blade's behavior or for localization of a load, a crack or other damage in the blade.

In an embodiment the excitation means may be a blade actuator, such as a pitch actuator arranged for adjusting the pitch of the blade.

In an embodiment the data signal from the one or more sensors are acquired together with other measured parameter types comprising one or more of wind speed, temperature, humidity, blade pitch, azimuth of the nacelle and yaw of the nacelle. The other parameters may be used as input for the mathematical model, or the acquired sensor signal may be compared with reference signals which are parameterized with respect to such parameter types.

In an embodiment the acquisition is synchronized in time with the generation of the excitation signal. The synchronization of exciting the blade and sampling data from the blade sensor may be performed so that sensor data are obtained simultaneously with the excitation from the start of the excitation, the sensor data may be obtained after a delay from the start of excitation in order to measure only steady-state vibrations, or the sensor data may be obtained after the excitation has stopped in order to measure only the decay response of the excitation.

A second aspect of the invention relates to a wind turbine comprising the detection system according to the first aspect for detecting an undesired loading of a wind turbine.

A third aspect of the invention relates to a method for detecting a change in the structural behavior of a wind turbine blade, the method comprises exciting a vibration of the blade using an exciter which has primary and secondary functions, the primary function is for normal operation of the wind carbine and the secondary function is for vibration excitation, acquiring a data signal from one or more blade sensors capable of detecting blade vibrations or blade deformations, processing the data signal for determining changes in the structural behavior of the blade on basis of the sensor signal.

In summary the invention relates to a method for detecting icing, other loadings on blades or changes of the blade which affect the structural, dynamic or aerodynamic behavior of wind turbines. Advantageously, the method utilizes existing wind turbine actuators, for example pitch actuators, for excitation of blade vibrations. Vibration sensors on the blade such as strain sensors or accelerometers measure the blade vibrations excited in response to the actively excited vibrations. By comparing the measured response with previously obtained reference responses, it is possible to determine if blade icing is present.

In general the various aspects of the invention may be combined and coupled in any way possible within the scope of the invention. These and other aspects, features and/or advantages of the invention will be apparent from and elucidated with reference to the embodiments described hereinafter.

BRIEF DESCRIPTION OF THE DRAWINGS

Embodiments of the invention will be described, by way of example only, with reference to the drawings, in which.

DETAILED DESCRIPTION OF EMBODIMENTS

Figure 1:
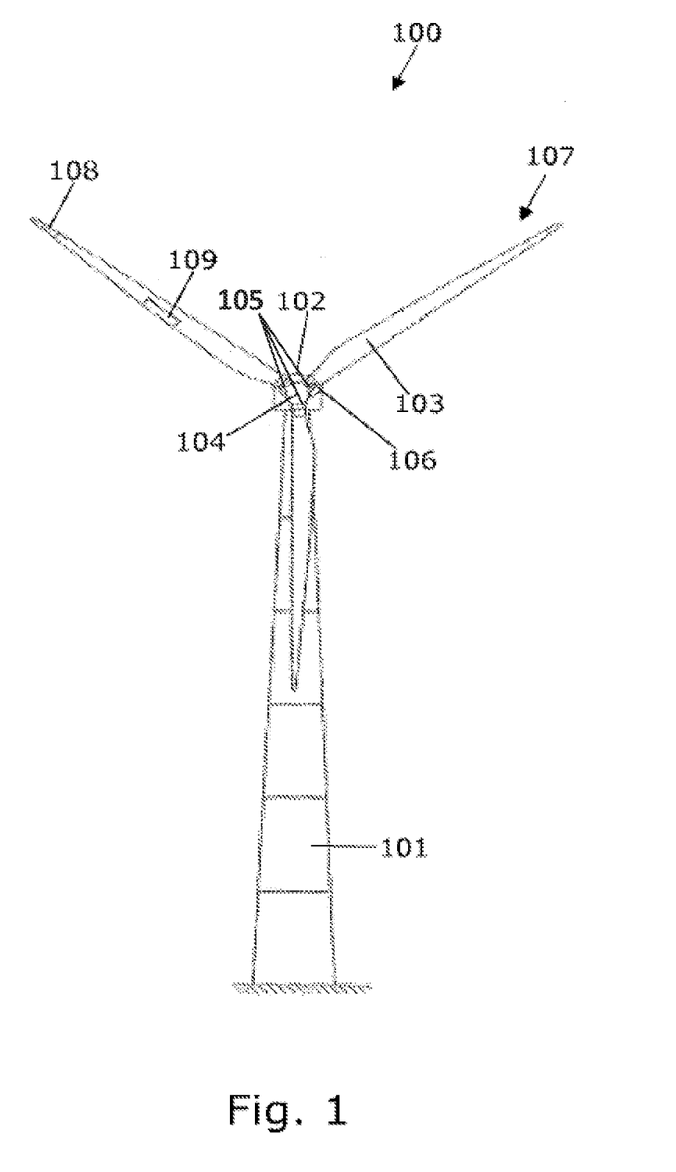
FIG. 1 shows a wind turbine generator.

FIG. 1 shows a wind turbine generator 100 comprising a tower 101 and a nacelle 102. Rotor blades 103 are fixed to a hub 104. The assembly of rotor blades 103, i.e. the rotor 107, is rotatable by action of the wind. The wind induced rotational energy of the rotor blades 103 can be transferred via the hub to a generator in the nacelle. Thus, the wind turbine generator 100 is capable of converting kinetic energy of the wind into mechanical energy by means of the rotor blade and, subsequently, into electric energy by means of the generator.

Rotor blades 103 or just blades 103 include, but is not limited to, an elongated structure having an airfoil-shaped profile suitable for providing an aerodynamic lift upon relative movement through air. Each rotor blade is rotatable along a longitudinal axis extending in the elongated direction of a blade and perpendicular to a blade bearing 106. The angular position of a blade equivalently referred to as the pitch of the blade. A pitch actuator 105 is engaged with each blade to enable rotation to a given pitch position.

The hub 104 is a structure provided with fastening means for fastening one or more rotor blades 103 and connectable with a shaft or other means for transferring the rotational energy of the blades to the generator or a gearbox.

Alternatively or additionally, the blades may be provided with tip ends 108 that are rotatable by actuators. Furthermore, the blades may be provided with flaps 109 arranged along the trailing edge to modify the aerodynamic blade properties by rotation or displacement of the flaps. Motion of the flaps is possible by use of flap actuators.

Figure 2:
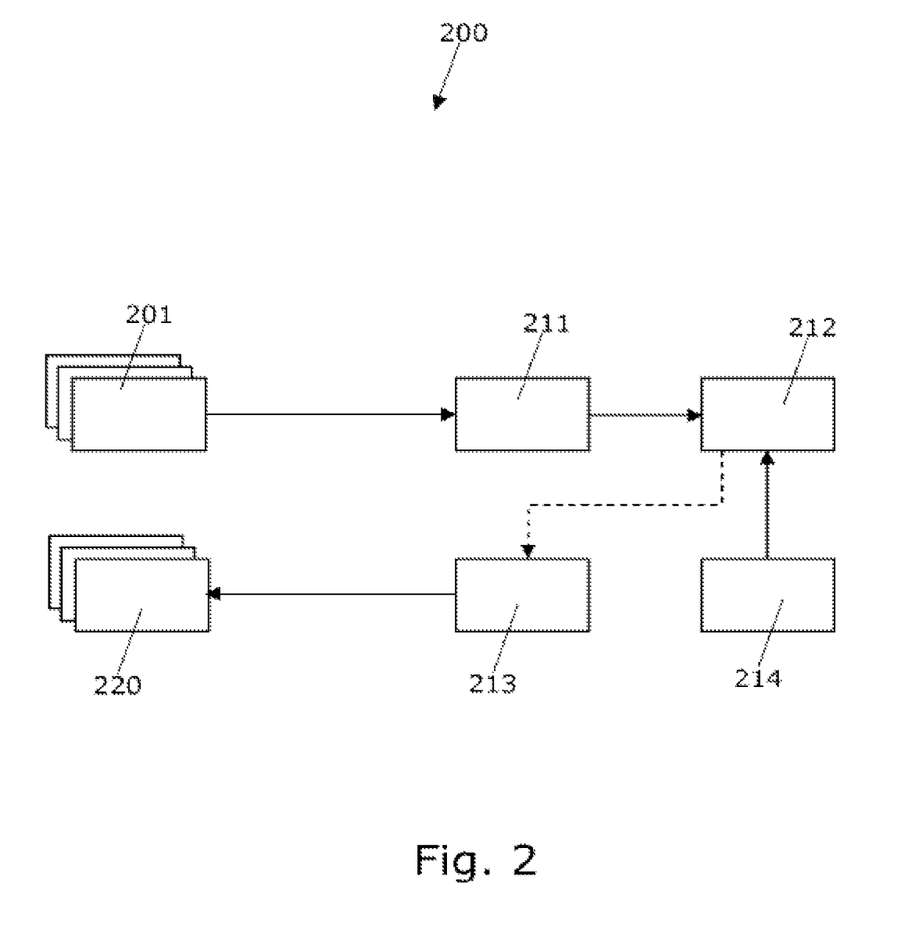
FIG. 2 shows a system for detection of undesired blade loading.

FIG. 2 shows parts of the wind turbine detection system 200 which is capable of detecting changes in the structural or dynamic behavior of blades, e.g. due to undesired loading of a wind turbine. The undesired loading may be caused by precipitation in the form of water, ice, salt, dirt or snow which builds up on the blade to form shells of ice over the entire blade or at portions of the blade. The additional blade loading caused by such blade icing may affect the dynamic and aerodynamic properties of the blade and eventually cause a failure or even breakdown of the blade. Furthermore, blade loading or other changes of the blade may cause downtime, failures of wind turbines and lost energy production.

The changes in the structural or dynamic behavior of blades may equivalently be affected due to detachment of blade parts from the blade, cracks in the composite material of the blade or other changes which affect the behavior of the blade and, thereby, may affect the efficiency of the wind turbine or may develop into failure of a blade.

The detection system 200 comprises one or more sensors 201 capable of detecting vibrations. Vibrations may be detected as deformations or accelerations of parts of the blade. The sensors may comprise deformation sensors or strain sensors such a fiber optic or electric strain gauges capable of detecting strain or stresses of the blade structure. The sensor may also comprise acceleration sensors such as fiber optic or piezo electric acceleration sensors capable of detecting accelerations of structural parts of the blade. The sensors are attached to inner and/or outer blade surfaces, e.g.

surfaces of the blade shell or other blade parts such as the blade spar. Alternatively, the sensors are molded into the blade construction. Throughout the description, sensor 201 may equivalents be referred to as vibration sensor, strain sensor or deformation sensors or just sensors.

Preferably, the sensors have a bandwidth enabling them to measure the structural accelerations or strains at least up to relevant resonance frequencies of the blade or blade parts. The resonance frequencies may be the first, second or higher resonances of flap wise, edge wise or torsion wise vibration modes.

The detection system further comprises one or more blade actuators 220, or generally any excitation means 220, arranged for adjusting the blade or a part of the blade. In an embodiment the blade actuator is a pitch actuator 105 whose primary use is to adjust the blade pitch and, thereby the aerodynamic properties, in order to obtain maximum power production. Alternatively or additionally, the blade actuator may comprise tip actuators and flap actuators for operation of blade tips 108 and flaps 109, respectively.

The detection system further comprises a signal generator 213 for generating an excitation signal to the blade actuator for exciting a vibration of the blade. The generated signal, e.g. in the form of a harmonic sinus signal or a signal containing multiple frequencies, such as a triangle signal, is supplied to the actuator either directly or indirectly via an actuator driver.

The detection system may comprise a data acquisition unit 211 for receiving the data signal from one or more sensors 201.

The dynamic characteristic, such as the resonance frequencies and frequency response of the blade are affected due to e.g. icing or other changes of the mass or mass distribution of the blade. Such dynamic characteristics of the blade can be determined by exciting vibrations in the blade and, in response to the excitation, either simultaneously or delayed from the excitation, obtaining values of acceleration or deformation of the blade as a function of time. The acceleration or deformation may be obtained as amplitudes of acceleration or deformation at a particular frequency or at a range of frequencies, i.e. in the form of a frequency spectrum of strain amplitude values.

Accordingly, by exciting a vibration in the blade 103 by use of a blade actuator 212 and measuring the response via one or more of the blade sensors 201 it is possible to obtain information of the dynamic properties of the blade, e.g. information about changes of resonance frequencies or changes in the spectrum of strain values or vibration amplitudes.

The sensor signal provided by blade sensors 201 may be in the form of a time signal or a spectrum of vibration amplitudes. The spectrum or frequency response may be obtained by a Fourier analysis of the time signal from sensors 201. For that purpose the detection system 200 may comprise a spectrum analyzer or FFT processor which may be integrated with the data acquisition unit 211 or the processor 212, e.g. in the form of a computer algorithm executable by the processor 212.

The blade response in form of raw sampled data or a processed data may be obtained simultaneously with the excitation or after a short delay from the excitation and, therefore, the acquisition of data from sensors 201 is synchronized in time with the generation of the excitation signal supplied to an actuator 220. It is understood that processed data cannot be obtained simultaneously with the excitation since a time delay will be involved with the data processing.

Alternatively, sensor data and possibly processed sensor data, e.g. FFT data, may be continuously obtained e.g. during operation or stillstand of the wind turbine, whereas excitation signals are generated at predetermined times or in dependence of parameters such as weather data. Thus, if a change of a resonance frequency or another change of the data signal is detected during the continuous sampling of sensor data, this detection may be used to determine changes in the dynamic, aerodynamic or structural behavior of a blade, or the detection may be used for generation of other excitation signals for confirmation of the detected change or for refinement of the detection.

By comparing the acquired sensor signal with reference signals, e.g. by use of a processor or computer 212, it is possible to infer if any undesired loading of the blade is present.

The reference signals may have been obtained from identical excitations, i.e. excitations with the same excitation signal, of the same blade or an equivalent blade which is not affected by any mass change. Thus, by determining differences, such as differences of the location of resonance frequencies or deformation amplitudes at particular frequencies, between the reference signal and the new sensor signal it is possible to determine an undesired loading.

Alternatively, the reference signals may have been obtained from identical excitation of the same blade or an equivalent blade which is affected by a known mass, and possibly a known location of the mass. Accordingly, by attaching a mass of a given shape to a blade, it is possible to obtain a reference signal corresponding to a particular undesired loading of a particular mass and possibly a particular location. By attaching different masses to the blade in turn and obtaining the reference signal in response to a known excitation, a series of reference signals are obtained which characterize different undesired loadings.

The reference signal may equivalently be in the form of a reference spectrum obtained by Fourier analyzing the time dependent reference signals.

Instead of comparing the sensor data with reference data, the sensor data may be used as input to a model which gives data regarding undesired loadings of the blade and possibly gives data regarding the mass and location of undesired loadings. The model may comprise parameters obtained from measurements or simulations of a blade which is exposed to known loadings. The model may be a dynamic model based on the dynamic blade properties, a neural network model or another suitable model.

For comparison of the measured signal from a sensor 201 with a reference signal or modeling of the measured data, the processing unit 212 is provided. From the result of the comparison, e.g. determination of a shifted resonance frequency, or the modeling, the processing unit is able to determine a state of the blade, i.e. whether a mass or load disturbance is present and possibly also where on the blade the disturbance is. The reference signals or model parameters may be stored in an electronic storage 214, i.e. a memory.

Any of the signal generator 213, the data acquisition unit 211 and the processor 212 may be used for other purposes in the wind turbine. For example, the signal generator 213 may be a signal generator used for generating reference signals for normal operation of the pitch actuator system. The data acquisition unit 211 may be used during normal operation of the wind turbine for monitoring static loads on the blade.

Since the detection system is able to detect changes in the loading of the blades, the system is generally able to detect any change of the blade, including icing, smudging due to sand, salt, earth as well as parts of the blade which come loose.

In general any blade actuator 220, or actually any excitation means 220, may be used for excitation of blade vibrations. Here an excitation is an actuator or system whose primary function is not vibration excitation, but normal operation of the wind turbine, e.g. optimization or control of energy production and control of wind turbine loadings. Accordingly, the excitation means has a secondary function for excitation of blade vibrations and, therefore, serves dual purposes.

The pitch actuator 105 used for adjusting the pitch of a blade may be used as an excitation means. Other blade actuators for excitation of vibrations comprise flap actuators and tip actuators for operation of respective blade flaps and tips. A blade flap is located in a recess of the trailing edge of the blade and may be rotatably hinged in the longitudinal direction of the blade. The primary use of the flap is to modify the aerodynamic profile of the blade, e.g. to modify the blade lift. A blade tip is an outer part of the blade which is rotatably hinged in the longitudinal direction of the blade which primary function is to modify e.g. the lift of the blade. Any of these blade actuators (pitch actuator 105, tip actuator, flap actuator and others) may, as a secondary function, be used for excitation of blade vibrations, e.g. by actuating the blade actuator to move back and forth.

Any of the pitch, blade tip and blade flap actuators may also excite blade vibrations by setting of the blade pitch, tip pitch and flap position so that the blade stalls due to a turbulent airflow. The turbulent airflow excites vibrations of the blade, which vibrations can be used equivalently to vibrations excited by repeated bark back and forth motion of the actuators to determine undesired blade loadings by analyzing the sensor signal.

Vibrations may also be excited by varying the torque load on the shaft which connects the blades 103 with the generator via a gearing or other connection means. The generator loads the blade shaft in dependence of the electrical loading of the generator by the power converter which converts the generator voltage to a voltage suitable for the utility grid. The electrical loading by the power converter corresponds to the power supplied to the utility grid, or a dump load, which power is set according to a power reference supplied to the power converter. Accordingly, by varying the power reference temporarily, the torque load on the shaft varies, which will cause the blades 103 to vibrate. Similarly, it is possible to vary the torque load on the blade shaft by temporarily and shortly activating a disc brake connected to the blade shaft so as to cause the blades to vibrate.

Whereas such methods of varying the torque load on the blade shaft may load components of the wind turbine, e.g. the gear box, unacceptably, such methods may be successfully used in some situations.

Vibrations excited by any of the excitation means comprising blade actuators, blade stall, electrical load and brake load variations can be measured by the sensors 201. Since the frequency response of the excited vibrations is affected by any positive or negative loading, i.e. loadings which add or subtract weight from the blade, the spectral location of resonance vibrations and generally the vibration amplitudes of the frequency response are affected by any loading. As described previously, the change of resonance frequencies and vibration amplitudes at particular frequencies of the measured spectrum is indicative of the mass and location of any loading.

The excitation of blade vibrations by excitation of a back and forth motion of the blade actuators may be performed when the rotor 107 is at standstill, i.e. does not rotate, when the rotor is idle, i.e. rotates slowly without generating power, or when the wind turbine is in operation, i.e. the rotor rotates and generates power. In comparison, excitation of blade vibrations by causing blades to stall or by electrical load and brake load variations can only be performed when the wind turbine is in operation.

The excitation signal generated by the signal generator 213 for any of the blade actuators and possibly the power reference of the power converter, may vary in time to excite blade vibrations.

Figure 3A:
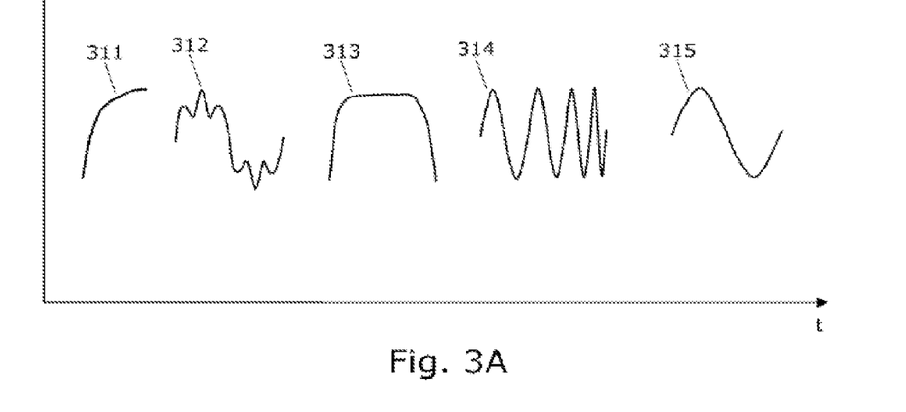
FIG. 3A-B show examples of excitations signals.

FIG. 3A shows different excitation signals that may be supplied e.g. to the pitch actuator 220. Excitation signal 311 represents any monotonically increasing signals comprising step, ramp and similar signals. Excitation signal 312 represents signals containing a superposition of a plurality of sinusoidal signals, signal 313 represents signals such as square, triangle and other shaped signals which repeats itself as a function of time, and signal 314 represents signals which varies in frequency as a function of time such as a sinusoidal signal which frequency increases linearly as a function of time. Alternatively a sinusoidal signal 315 having a single frequency may be used as an excitation signal. Any of the signals 312-315 are characterized in that a continuous part of the excitation signal has at least one part which increases as a function of time and at least one part which decreases as a function of time.

Figure 3B:
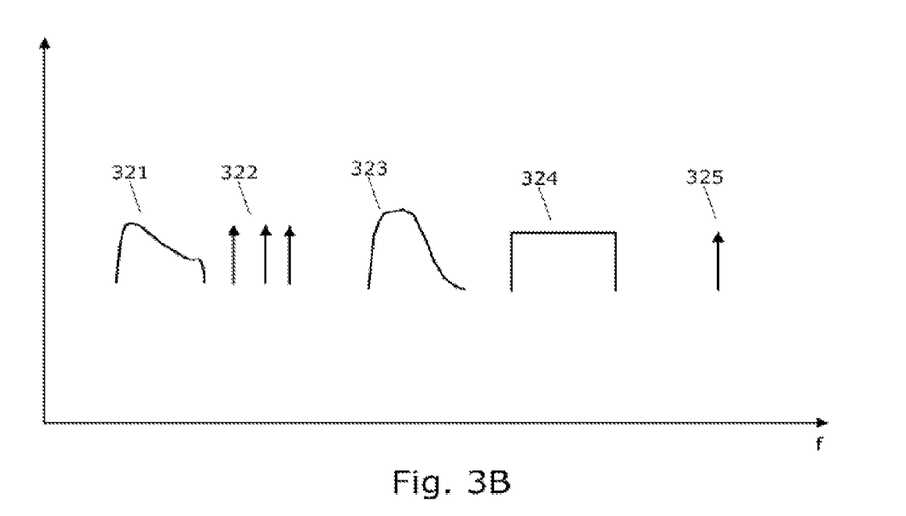

FIG. 3B shows the frequency spectra 321-325 of the signals 311-315. Accordingly, excitation signals 311-314 includes a plurality of frequency components, either a plurality of discrete frequencies 322 or a continuous distribution of frequencies 321, 323-324, where the pluralities of frequencies are generated substantially simultaneously for signals 321-323 or time shifted for the sweep signal 324. Signal 325 comprises only a single frequency component 325.

Any of the excitation signals 311-315 will excite blade vibrations. The frequency spectrum of the excitation signals may be chosen to be close to or to include resonance frequencies of the blade.

Figure 4A:
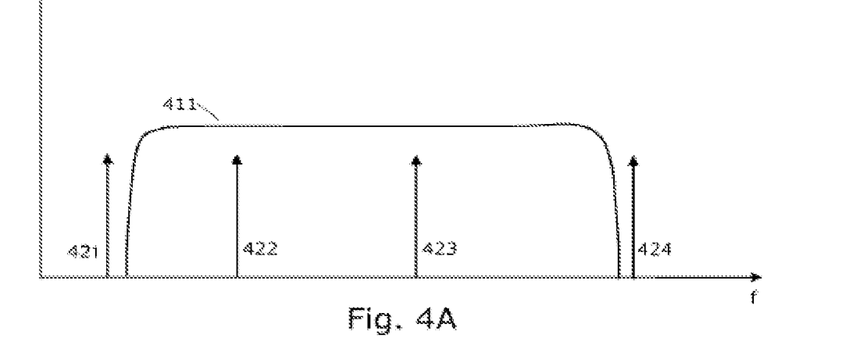
FIG. 4A shows the frequency spectrum of an excitation signal in comparison with resonance frequencies of a blade.

FIG. 4A shows the spectrum 411 of an excitation signal, which includes natural or resonance frequencies 421, 422 of the blade and is located close to resonance frequencies 423, 424.

Figure 4B:
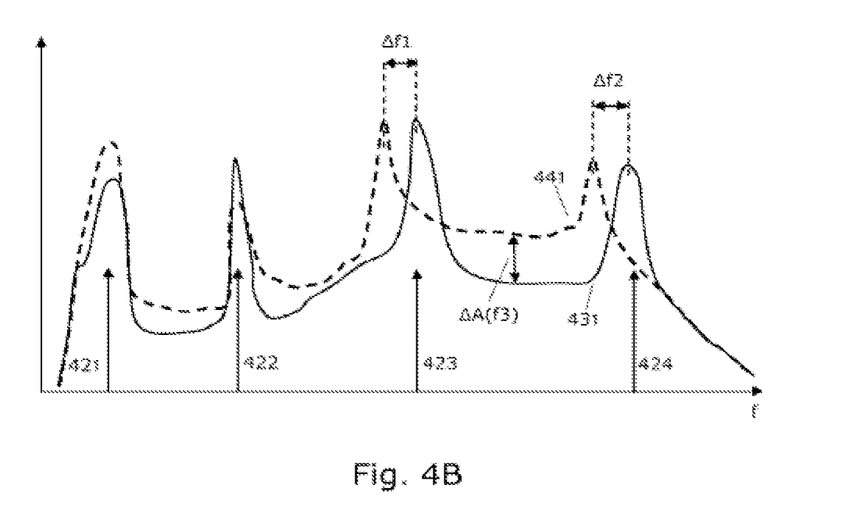
FIG. 4B shows a spectrum of a sensor signal obtained in response to a vibration excitation in comparison with a reference spectrum.

FIG. 4B shows a frequency response 431 obtained by Fourier processing a data signal from one or more of the sensors 201. The response 431 has amplitude peaks at the resonance frequencies 421-424. The response 431 is obtained from an unloaded blade, i.e. which is not affected by any loads such as ice. In comparison, response 441 is obtained from a blade with undesired loading from ice. Frequency response 441 which is obtained from a sensor signal similarly to response 431 shows that resonance frequencies 423 and 424 are shifted due to the icing. Frequency response 441 also shows that vibration amplitudes in-between resonance frequencies are modified.

Since the vibration amplitudes including resonance amplitudes may depend on the amplitude of the excitation signal 311-315, the sensor signal from vibration sensors 201 or the Fourier processed sensor signal may be normalized with respect to an amplitude or a spectrum of amplitudes of the excitation signal 311-315.

By comparing the acquired sensor signal which may be in the form of a Fast Fourier Transform 441 of the sensor signal with a reference signal, frequency shifts $\Delta f1$, $\Delta f2$ of resonances 421-424 and changes in the vibration amplitudes ΔA(f3) can be determined, and from this it is possible to determine if any undesired loading is present.

Whereas a comparison may be based on spectrums of the sensor signal obtained by a Fourier analysis, the comparison may equally be based on the time signals from a sensor 201, since the processor 212 may have functionalities, e.g. algorithms, capable of determining the frequency content or spectrum of the time signals.

For example, if one of the resonances 421-424 has shifted by a given frequency, e.g. 1 Hz, or if the vibration amplitude has changed by a certain amount, e.g. 20 percent of the amplitude of the unloaded blade, this triggers the processor 212 to generate a warning signal indicating that some loading is present. The direction of a frequency shift of a resonance may be used to determine if positive loading is present, i.e. addition of a mass, or negative loading is present, i.e. subtraction of a mass, e.g. due to a fracture of the blade. Normally, a decrease of the resonance frequency means that mass, e.g. ice is added to the blade, and an increase of the resonance frequency means that mass, e.g. a shell of the blade, is removed from the blade. Similarly, the value of the frequency shift of a resonance can be used to estimate the value of the mass of the undesired loading. The value of the undesired mass can be used to determine whether a full stop of the turbine is required, a different pitch strategy should be selected, the turbine should be de-rated, or if operation is still possible. In the same way, increases and decreases of vibration amplitudes at frequencies other than the resonance frequencies can be used to determine any positive or negative undesired loading.

Acquisition of the sensor signal may be performed simultaneously with transmission of the excitation signal 311-315, i.e. so that when the first value of the excitation signal is supplied, then the first values from a sensor 220 is sampled. The acquisition of the sensor signal may continue for as long as the excitation signal is transmitted, and possibly continue for a time after the transmission of an excitation signal has stopped. Alternatively, the acquisition or sampling of the first value from a sensor 220 may be time delayed relative to transmission of the first value of the excitation signal to an excitation means. Thus, in general the timing of acquisition of measurements from sensors 220 is synchronized with the timing of transmission of the excitation signal and, thereby, the vibration excitation. Processing of the acquired data signal, such as Fourier processing may be performed real time so that sampled sensor data are processed when they are available. Alternatively, the processing may be performed with a delay from a number of sensor samples which have initially been stored. E.g. 100 samples may be initially be sampled and stored and then processed.

Figure 5:
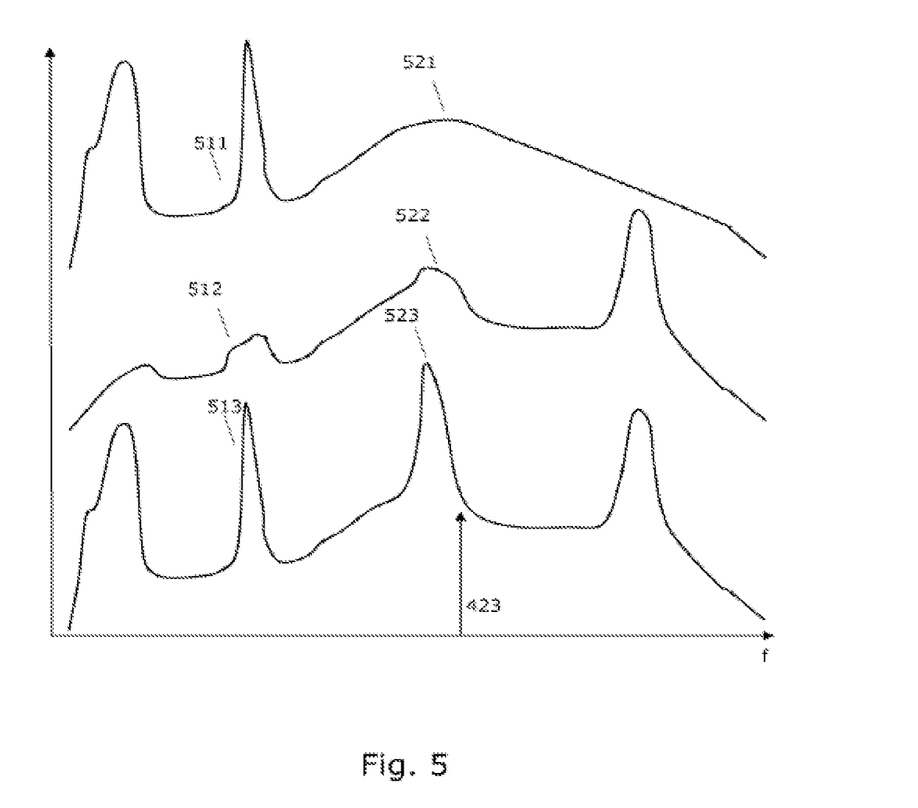
FIG. 5 shows vibration spectra obtained from sensors located at different blade positions.

FIG. 5 shows first, second and third Fourier transformations 511-513 of sensor signals obtained from first, second, and third vibrations sensors 201 located at different locations on the blade, e.g. distributed along the length of the blade. The responses 511-513 are arbitrarily shifted in the vertical direction/amplitude direction for convenience. Assume that four natural vibration modes with four different resonance frequencies are excited as shown by response 513. Each of the first, second and third sensors 201 detect the resonance peaks us shown by responses 511-513. However, due to the shape of the vibration, i.e. the shape of the vibration mode, at the location of some of the sensors the amplitudes are smaller than at other locations. Assume that it has been detected that the frequency of resonance peaks 521-523 are shifted relative to the reference resonance frequency 423, then by analyzing amplitudes of the peaks 521-523 the shape of this vibration mode, e.g. along the longitudinal direction of the blade, can be determined. That is, when a number of vibration amplitudes along a given direction are known and the resonance frequency is known, the mode shape can be approximated. By comparing the determined shape of the vibration with a reference vibration mode obtained with a know location of an undesired loading, the unknown spatial location of the undesired loading can be determined or estimated.

It may be advantageous to be able to determine the location of ice on a blade, since heating means integrated in the blade can be activated at a particular location instead of heating the entire blade.

The capability of locating the ice accretion on the blade will also enable a better risk evaluation of ice shredding. This can again lead to a better operational strategy for the wind turbine generator which optimizes the operational period.

The reference vibration modes may be determined from the previous described reference signals or reference spectra by analyzing the vibration amplitudes from different sensors 201 located at different blade locations similarly to obtaining vibration mode shapes from non-reference measurements.

Figure 6:
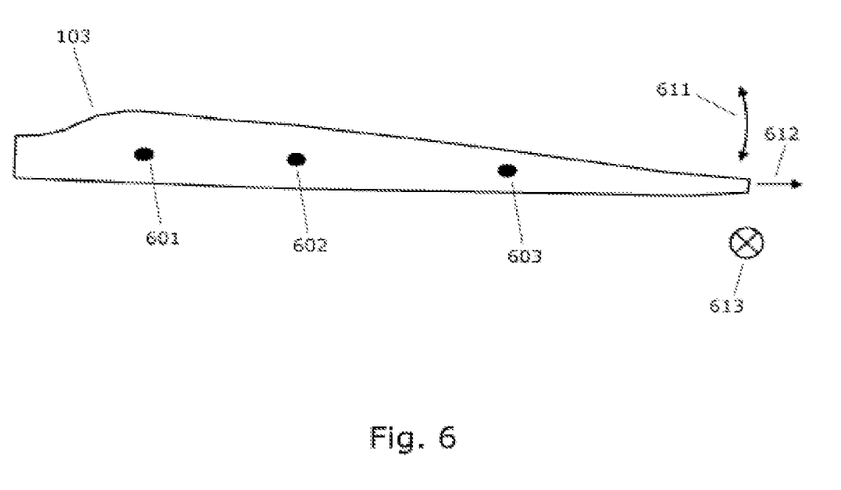
FIG. 6 shows a blade with a plurality of vibration sensors.

FIG. 6 shows vibration modes of the blade comprising edge wise modes 611, torsion modes 612 around the longitudinal axis of the blade and flap wise modes 613 in a direction out of the paper. The vibration sensor 201, 601-603 may be placed on the blade so as to enable to best possible detection of particular vibration modes.

Since wind speed, temperature and humidity may affect the measurements from the sensors 201, the sensor signals or sensor spectra may be parameterized with respect to wind speed, temperature, humidity and other parameters. Similarly, the reference signal, the reference spectra and reference modes may be parameterized with respect to such parameters so that a comparison between sensor signals and references are made independent on any such parameters.

In an embodiment the excitation signal supplied e.g. to a pitch actuator is adaptively adjusted depending on the measured sensor signals. For example, the bandwidth, i.e. the spectrum, of the excitation signal may be narrowed if the response shows that that a particular frequency has shifted—in that case the spectrum may be narrowed so that it only excites this relevant frequency. Similarly, the amplitude of the excitation signal may be reduced to reduce vibration amplitudes, or the excitation amplitude may be increased if the sensor response is too weak. As another example the frequency or spectrum of the excitation signal may be increased throughout a particular range to excite different vibration modes so as to search for possible undesired loadings and possibly search for particular locations on the blade of undesired loadings. The adjustment of the excitation signal based on the response may be performed by the processor 212 which sends instructions to the signal generator 213 as by the dotted line in FIG. 2.

While the invention has been illustrated and described in detail in the drawings and foregoing description, such illustration and description are to be considered illustrative or exemplary and not restrictive; the Invention is not limited to the disclosed embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited

The invention claimed is:

1. A system for detecting a change in the dynamic behavior of a wind turbine blade, the system comprises:
   one or more sensors capable of detecting vibrations of the wind turbine blade;
   an exciter capable of exciting a vibration of the blades, where the exciter has primary and secondary functions, the primary function is for operation of the wind turbine and the secondary function is for vibration excitation, wherein the exciter is a blade actuator, wherein the blade actuator is a pitch actuator arranged for adjusting the pitch of the blade;
   a signal generator for generating an excitation signal to the exciter for exciting a vibration of the blade;
   a data acquisition unit for receiving a data signal from the one or more sensors; and
   a processing unit for determining changes in the dynamic behavior of the blade on the basis of the data signal, wherein the changes in the dynamic behavior of the blade includes a change to a shift of a resonance frequency of the blade from a first frequency to a second frequency.

2. The system according to claim 1, further comprising a spectrum analyzer for determining the frequency spectrum of the acquired sensor signal.

3. The system according to claim 1, wherein a continuous part of the excitation signal comprises at least one increasing part and at least one decreasing part.

4. The system according to claim 1, wherein the excitation signal comprises a plurality of frequency components.

5. The system according to claim 1, wherein the processing unit is capable of determining a new excitation signal for the signal generator, wherein the frequency content of the new excitation signal is changed in dependence of the previously acquired data signal.

6. The system according to claim 1, wherein the data signal from the one or more sensors are acquired together with other measured parameter types comprising one or more of wind speed, temperature, humidity, pitch, azimuth and yaw.

7. The system according to claim 1, wherein the acquisition of the data signal is synchronized in time with the generation of the excitation signal.

8. A wind turbine comprising the system according to claim 1 for detecting an undesired loading of a wind turbine.

9. A method for detecting a change in the dynamic behavior of a wind turbine blade, the method comprises:
   exciting a vibration of the blade using an exciter which has primary and secondary functions, the primary function is for normal operation of the wind turbine and the secondary function is for vibration excitation;
   acquiring a data signal from one or more blade sensors capable of detecting blade vibrations;
   processing the data signal for determining changes in the dynamic behavior of the blade on basis of the data signal, wherein the changes in the dynamic behavior of the blade includes a change to a shift of a resonance frequency of the blade from a first frequency to a second frequency; and
   wherein the exciter is a blade actuator, wherein the blade actuator is a pitch actuator arranged for adjusting the pitch of the blade.

10. The method of claim 9, further comprising determining the frequency spectrum of the acquired data signal.

11. The method of claim 9, wherein a continuous part of the vibration excitation comprises at least one increasing part and at least one decreasing part.

12. The method of claim 9, wherein the vibration excitation comprises a plurality of frequency components.

13. The method of claim 9, determining a new vibration excitation, wherein the frequency content of the vibration excitation is changed in dependence of the previously acquired data signal.

14. The method of claim 9, wherein the data signal from the one or more blade sensors are acquired together with other measured parameter types comprising one or more of wind speed, temperature, humidity, pitch, azimuth and yaw.

15. The method of claim 9, wherein the acquisition of the data signal is synchronized in time with the generation of the excitation signal.

16. A wind turbine, comprising: wind turbine blades;
   one or more sensors capable of detecting vibrations of the wind turbine blade;
   an exciter capable of exciting a vibration of the blades, where the exciter has primary and secondary functions, the primary function is for operation of the wind turbine and the secondary function is for vibration excitation, wherein the exciter is a blade actuator, wherein the blade actuator is a pitch actuator arranged for adjusting the pitch of the blade;
   a signal generator for generating an excitation signal to the exciter for exciting a vibration of the blade;
   a data acquisition unit for receiving a data signal from the one or more sensors; and
   a processing unit for determining changes in the dynamic behavior of the blade on the basis of the data signal, wherein the changes in the dynamic behavior of the blade includes a change to a shift of a resonance frequency of the blade from a first frequency to a second frequency.

17. The wind turbine according to claim 16, further comprising a spectrum analyzer for determining the frequency spectrum of the acquired sensor signal.

18. The wind turbine according to claim 16, wherein the processing unit is capable of determining a new excitation signal for the signal generator, wherein the frequency content of the new excitation signal is changed in dependence of the previously acquired data signal.

* * * * *